(12) United States Patent
Zhang et al.

(10) Patent No.: US 8,934,772 B2
(45) Date of Patent: Jan. 13, 2015

(54) METHOD AND SYSTEM FOR UPSTREAM BANDWIDTH ALLOCATION IN A PASSIVE OPTICAL NETWORK

(75) Inventors: Weiliang Zhang, Shenzhen (CN); Dan Geng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 235 days.

(21) Appl. No.: 13/577,913

(22) PCT Filed: Nov. 5, 2010

(86) PCT No.: PCT/CN2010/078450
§ 371 (c)(1),
(2), (4) Date: Sep. 8, 2012

(87) PCT Pub. No.: WO2011/097904
PCT Pub. Date: Aug. 18, 2011

(65) Prior Publication Data
US 2013/0045011 A1 Feb. 21, 2013

(30) Foreign Application Priority Data
Feb. 12, 2010 (CN) .......................... 2010 1 0122498

(51) Int. Cl.
*H04J 14/02* (2006.01)
*H04J 14/00* (2006.01)
(Continued)

(52) U.S. Cl.
CPC .......... *H04J 3/1694* (2013.01); *H04Q 11/0067* (2013.01); *H04B 10/272* (2013.01); *H04Q 2011/0064* (2013.01); *H04Q 2011/0081* (2013.01)
USPC ................... 398/58; 398/43; 398/66; 398/79; 398/25

(58) Field of Classification Search
CPC .............. H04J 14/0227; H04J 14/0212; H04J 14/0222; H04Q 11/0062; H04Q 11/0067
USPC ................................. 398/58, 66, 43
See application file for complete search history.

(56) References Cited

U.S. PATENT DOCUMENTS 7,983,308 B1 * 7/2011 Johnston et al. .............. 370/514
7,991,296 B1 * 8/2011 Johnston et al. .............. 398/154
(Continued)

FOREIGN PATENT DOCUMENTS

| CN | 101232326 A | 7/2008 |
|---|---|---|
| CN | 101420640 A | 4/2009 |
| WO | 2009069880 A1 | 6/2009 |

OTHER PUBLICATIONS

International Search Report on international application No. PCT/CN2010/078450, mailed on Jan. 20, 2011.
(Continued)

*Primary Examiner* — Oommen Jacob
(74) *Attorney, Agent, or Firm* — Oppedahl Patent Law Firm LLC

(57) ABSTRACT

A method for upstream bandwidth allocation in a passive optical network is provided by the disclosure. The method includes the following steps: an Optical Line Terminal (OLT) allocates an upstream bandwidth for an Optical Network Unit (ONU) through an upstream bandwidth mapping (US BWmap) domain, wherein the total length B of payloads transmitted by consecutive Transmission Containers (T-CONTs) allocated for the ONU is: the product of the positive integer n and the data byte length L contained in a code word when the ONU uses Forward Error Correction (FEC) encoding, minus the byte length R of the contents protected by FEC, except the payloads, in an upstream burst slot transmitted by the ONU, i.e. B=L×n−R bytes (401); and the ONU encapsulates the upstream data according to the size of the T-CONT total bandwidth allocated by the OLT and transmits it to the OLT (402). A system for upstream bandwidth allocation in a passive optical network is also provided by the disclosure. Application of the disclosure reduces the complexity of processing FEC-encoded data by the ONU and the OLT, and improves the encoding efficiency of the ONU and the decoding efficiency of the OLT.

8 Claims, 2 Drawing Sheets

```
┌─────────────────────────────────────────────────┐
│ an OLT allocates an upstream bandwidth for an ONU through a US │
│ BWmap domain, wherein the total length B of payloads transmitted │
│ by consecutive T-CONTs allocated for the ONU is:  the product of a │
│ positive integer n and a byte length L of data contained in a code │
│ word when the ONU uses FEC encoding, minus a byte length R of │── 401
│ contents protected by FEC, except the payloads, in an upstream │
│ burst slot transmitted by the ONU, i.e. B=L×n-R bytes │
└─────────────────────────────────────────────────┘
                            │
                            ▼
┌─────────────────────────────────────────────────┐
│ the ONU encapsulates upstream data according to the size of the │── 402
│ T-CONT total bandwidth allocated by the OLT and transmits it to │
│ the OLT │
└─────────────────────────────────────────────────┘
```

(51) Int. Cl.
*H04B 17/00* (2006.01)
*H04B 10/00* (2013.01)
*H04J 3/16* (2006.01)
*H04Q 11/00* (2006.01)
*H04B 10/272* (2013.01)

(56) References Cited

U.S. PATENT DOCUMENTS

| | | | | |
|---|---|---|---|---|
| 8,315,520 | B2* | 11/2012 | Zou | 398/67 |
| 8,406,633 | B1* | 3/2013 | Johnston et al. | 398/154 |
| 8,634,431 | B1* | 1/2014 | Chiang et al. | 370/412 |
| 8,655,166 | B2* | 2/2014 | Soto et al. | 398/13 |
| 8,712,240 | B2* | 4/2014 | Ding et al. | 398/66 |
| 8,718,087 | B1* | 5/2014 | Johnston et al. | 370/463 |
| 2009/0226170 | A1* | 9/2009 | Zou | 398/79 |
| 2010/0208747 | A1* | 8/2010 | Gordon et al. | 370/468 |
| 2010/0221006 | A1* | 9/2010 | Yoon et al. | 398/58 |
| 2011/0211827 | A1* | 9/2011 | Soto et al. | 398/25 |
| 2013/0045011 | A1* | 2/2013 | Zhang et al. | 398/58 |

OTHER PUBLICATIONS

English Translation of the Written Opinion of the International Search Authority in international application No. PCT/CN20101078450, mailed on Jan. 20, 2011.

* cited by examiner

Fig. 3

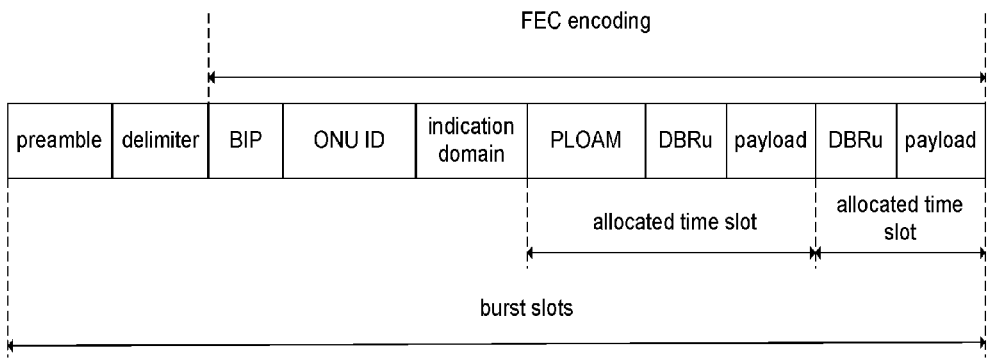

Fig. 4 an OLT allocates an upstream bandwidth for an ONU through a US BWmap domain, wherein the total length B of payloads transmitted by consecutive T-CONTs allocated for the ONU is: the product of a positive integer n and a byte length L of data contained in a code word when the ONU uses FEC encoding, minus a byte length R of contents protected by FEC, except the payloads, in an upstream burst slot transmitted by the ONU, i.e. B=L×n-R bytes — 401 the ONU encapsulates upstream data according to the size of the T-CONT total bandwidth allocated by the OLT and transmits it to the OLT — 402

METHOD AND SYSTEM FOR UPSTREAM BANDWIDTH ALLOCATION IN A PASSIVE OPTICAL NETWORK

TECHNICAL FIELD

The disclosure relates to bandwidth allocation technology in the field of communications, and particularly to a method and a system for upstream bandwidth allocation in a Passive Optical Network (PON).

BACKGROUND

Gigabit-Capable Passive Optical Network (GPON) technology is an important branch of PON technology. Similar to other PON technology, GPON is also a passive optical access technology using point-to-multipoint topology. FIG. 1 shows topology of a GPON system. The GPON is composed of an office-side Optical Line Terminal (OLT), a user-side Optical Network Unit (ONU) and an Optical Distribution Network (ODN), and generally uses a point-to-multipoint network structure. The ODN is composed of a single-mode optical fiber, an optical divider and an optical connector and other passive optical devices, providing an optical transmission medium for the physical connection between the OLT and the ONU.

In the GPON system, data transmission in a downlink direction (from the OLT to the ONU) applies a broadcast mode. Each ONU receives all frames respectively and obtains a frame belonging to itself according to an ONU-ID, a GPON Encapsulating Method port ID (GEM-port ID) and an allocation ID. For data transmission in an upstream direction (from the ONU to the OLT), since each ONU needs to share a transmission medium, each ONU transmits upstream data within a timeslot which is allocated to itself by the OLT through an Upstream Bandwidth Map (US BWmap) domain. FIG. 2 shows an US BWmap structure; the US BWmap is composed of N Allocation Structures, each of which is composed of an Allocation Identifier (Alloc-ID) domain, a Flags domain, a StartTime domain, a StopTime domain and a Cyclic Redundancy Check (CRC) domain; wherein the Alloc-ID is generally a Transmission Container (T-CONT) ID; there are 12 bits (bits 11 to 0) in the Flags domain, bit 10 being used for notifying the ONU to transmit a Physical Layer Operations Administration and Maintenance (PLOAM) message within the upstream bandwidth, and bits 6 to 0 being reserved.

When receiving one Allocation Structure, the ONU performs a CRC check on data in the received Allocation Structure if the ONU determines that the Allocation Structure is allocated to itself according to an Alloc-ID. If the check result is correct, the ONU starts to transmit data in a T-CONT whose bandwidth allocation ID is Alloc-ID from the StartTime indicated by the Allocation Structure and stops transmitting data at the StopTime. To prevent a conflict among upstream data sent by different ONUs, there is a guard time among the upstream data sent by different ONUs. Each ONU transmits upstream data in a continuous period allocated by the OLT. The continuous period is called an upstream burst slot of an ONU. FIG. 3 shows a structure of data transmitted in an upstream burst slot by an ONU. The data sent by the ONU in an upstream burst slot includes a preamble, a delimiter, an Bit Interleaved Parity (BIP) domain, an ONU ID, an indication domain, a PLOAM message and n groups of Dynamic Bandwidth Reports upstream (DBRu) and payloads (n is an integer and n≥0), wherein the PLOAM message as well as the first group of DBRu and payload are the first allocated time slot allocated by the OLT in a downlink frame for the ONU, corresponding to one Allocation Structure in the BWmap in the OLT downlink frame; the start time of the allocated time slot is the StartTime in the Allocation Structure, and the stop time of the allocated time slot is the StopTime in the Allocation Structure.

To check and correct an error code existing in upstream data transmitted by the ONU and received by the OLT, the upstream data transmitted by the ONU undergoes Forward Error Correction (FEC) encoding, and is transmitted to the OLT subsequently. The range of the FEC encoding is as shown in FIG. 3, starting from the BIP domain of the upstream burst slot and ending at the domain of the last group of payloads. Reed-Solomon (RS) encoding is applied to FEC-related technology in existing GPON systems. The RS encoding is block-based, which takes a data block with a fixed size and adds additional redundancy bits at the ending of the data block. The data block with a fixed size and the added additional redundancy bits form a code word. The data in the protection range of the FEC, which has undergone the FEC encoding by the method above, is transmitted to the OLT. An FEC decoder at the OLT uses these additional bits to process received data streams, discover errors, correct the errors and obtain original data transmitted by the ONU.

In the RS encoding applied above, after an FEC encoder of the ONU takes out m data blocks with a fixed size, the length of the remaining data is generally smaller than the fixed size. To make the length of the remaining data equal to the fixed size, an additional "0" byte ("0" padding byte) needs to be added in front of the remaining data. The encoder calculates check bytes for the remaining data added with the "0" byte. The ONU removes the added "0" byte subsequently, and transmits the remaining data and the check bytes to the OLT. After receiving the data transmitted by the ONU, for the remaining data, the OLT inserts before decoding the additional "0" byte in the front of the code word. After the decoding, the added "0" byte is removed over again. Thus, it can be seen that the process of adding and removing a "0" byte is relatively cumbersome, which increases the complexity of processing FEC-encoded data by the OLT and the ONU.

SUMMARY

In view of this, the main purpose of the disclosure is to provide a method and a system for upstream bandwidth allocation in a PON, to solve the problem of complexity of processing FEC-encoded data in an existing upstream bandwidth allocation process.

To achieve the purpose above, the technical solution of the disclosure is implemented as follows.

The disclosure provides a method for upstream bandwidth allocation in a PON, including:

allocating, by an OLT, an upstream bandwidth for an ONU through a US BWmap domain, wherein a total length B of payloads transmitted by consecutive T-CONTs allocated for the ONU is: the product of a positive integer n and a byte length L of data contained in one code word when the ONU uses FEC encoding, minus a byte length R of contents protected by FEC, except the payloads, in an upstream burst slot transmitted by the ONU, i.e. B=L×n−R bytes; and encapsulating, by the ONU, upstream data according to a size of a T-CONT total bandwidth allocated by the OLT and transmitting it by the ONU to the OLT.

The method may further include:

a length of a payload transmitted by a first T-CONT allocated by the OLT for the ONU is L×m−H bytes, where H is a byte length of contents protected by FEC before the payload in the upstream burst slot transmitted by the ONU;

a length of a payload transmitted by a last T-CONT allocated for the ONU is L×k−T bytes, where T is a byte length of contents protected by FEC after the payload in the upstream burst slot transmitted by the ONU; and a length of a payload which is transmitted neither by the first T-CONT nor by the last T-CONT allocated for the ONU is L×p bytes, where L represents a byte length of data contained in one code word when the ONU uses FEC encoding, m and k are positive integers while m, k, p<n, and H+T=R.

The method may further include: when the ONU encapsulates the upstream data according to the size of the T-CONT total bandwidth allocated by the OLT, transmitting an idle frame when there is no sufficient data which needs to be transmitted in a certain T-CONT.

The disclosure further provides a system for upstream bandwidth allocation in a PON, including an OLT and an ONU, wherein the OLT is configured to allocate an upstream bandwidth for the ONU through a US BWmap domain, wherein a total length B of payloads transmitted by consecutive T-CONTs allocated for the ONU is: the product of a positive integer n and a byte length L of data contained in one code word when the ONU uses FEC encoding, minus a byte length R of contents protected by FEC, except the payloads, in an upstream burst slot transmitted by the ONU, i.e. B=L×n−R bytes; and the ONU is configured to encapsulate upstream data according to a size of a T-CONT total bandwidth allocated by the OLT and transmit it to the OLT.

The OLT may be further configured to: a length of a payload transmitted by a first T-CONT allocated for the ONU is L×m−H bytes, where H is a byte length of contents protected by FEC before the payload in the upstream burst slot transmitted by the ONU;

a length of a payload transmitted by a last T-CONT allocated for the ONU is L×k−T bytes, where T is a byte length of contents protected by FEC after the payload in the upstream burst slot transmitted by the ONU; and a length of a payload transmitted by a T-CONT allocated for the ONU, which is neither the first T-CONT nor by the last T-CONT, is L×p bytes, where L represents a byte length of data contained in one code word when the ONU uses FEC encoding, m and k are positive integers while m, k, p<n, and H+T=R.

The ONU may be further configured to, when the ONU encapsulates the upstream data according to the size of the T-CONT total bandwidth allocated by the OLT, transmit an idle frame when there is no sufficient data which needs to be transmitted in a certain T-CONT.

According to the method and system for upstream bandwidth allocation in a PON, an OLT allocates an upstream bandwidth for an ONU by a US BWmap domain, wherein the total length B of payloads transmitted by the consecutive T-CONTs allocated for the ONU is: the product of a positive integer n and the byte length L of data contained in one code word when the ONU uses Forward Error Correction (FEC) encoding, minus the byte length R of the contents protected by FEC, except the payloads, in an upstream burst slot transmitted by the ONU, i.e. B=L×n−R bytes; the ONU encapsulates upstream data according to the size of the T-CONT total bandwidth allocated by the OLT and transmits it to the OLT. By using the method and system of the disclosure, the ONU performs FEC encoding on taken-out data blocks with a fixed size respectively, wherein the quantity of the data blocks is a integral number, thus avoiding adding an additional "0" byte in front of the remaining data, reducing the complexity of processing FEC-encoded data by the ONU and the OLT, and improving the encoding efficiency of the ONU and the decoding efficiency of the OLT.

BRIEF DESCRIPTION OF THE DRAWINGS

FIG. 3 is a structure diagram illustrating data transmission in an upstream burst slot by an ONU in an existing technology; and FIG. 4 is a flowchart of a method for upstream bandwidth allocation in a PON of the disclosure.

DETAILED DESCRIPTION OF THE INVENTION

Figure 1:
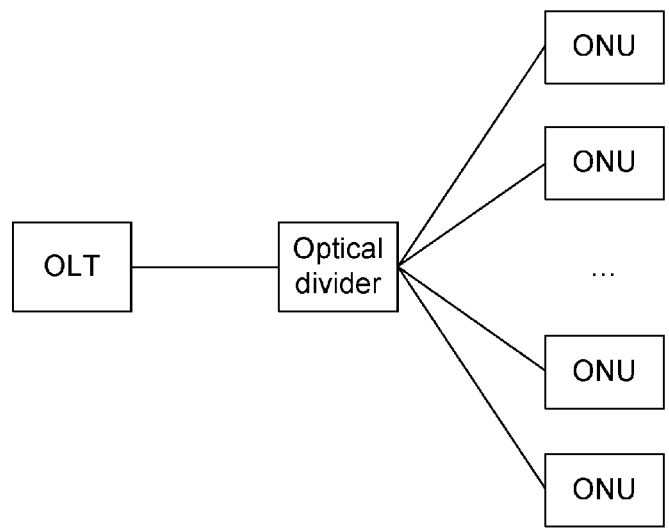
FIG. 1 is a topology schematic diagram of a GPON system in an existing technology.
Figure 2:
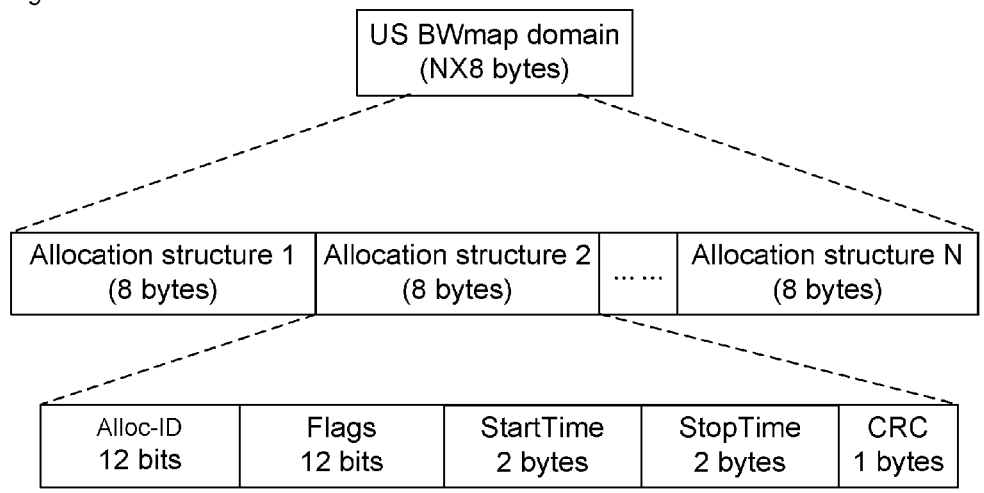
FIG. 2 is a structure diagram of US BWmap in a downlink frame of a GPON in an existing technology.

The technical solution of the disclosure is further described in details below in combination with the accompanying drawings and embodiments.

To solve the problem that when FEC encoding is applied to upstream data transmitted by an ONU in an existing technology, the length of remaining data is smaller than a fixed size adopted by the FEC encoding, the disclosure provides a method for upstream bandwidth allocation in a PON. As shown in FIG. 4, the method mainly includes the following steps.

Step 401: an OLT allocates an upstream bandwidth for an ONU through a US BWmap domain, wherein the total length B of payloads which can be transmitted by consecutive T-CONTs allocated for the ONU is: the product of a positive integer n and a byte length L of data contained in a code word when the ONU uses FEC encoding, minus a byte length R of the contents protected by FEC, except the payloads, in an upstream burst slot transmitted by the ONU, i.e. B=L×n−R bytes;

provided that the byte length of the contents protected by FEC before the payload part in the upstream burst slot transmitted by the ONU is H, the byte length of the contents protected by FEC after the payload part in the upstream burst slot transmitted by the ONU is T and naturally H+T=R, then the disclosure provides a preferred T-CONT bandwidth allocation method as follows: the length of a payload which can be transmitted by the first T-CONT allocated by the OLT for the ONU is L×m−H, the length of a payload which can be transmitted by the last T-CONT allocated by the OLT for the ONU is L×m−T and the length of a payload which can be transmitted by neither the first T-CONT nor the last T-CONT is L×p bytes, where L represents a code word length when the ONU uses FEC encoding; m, k and p are positive integers while m, k, p<n; H is the byte length of the contents protected by FEC before the payload part in the upstream burst slot transmitted by the ONU and T is the byte length of the contents protected by FEC after the payload part in the upstream burst slot transmitted by the ONU.

Of course, the T-CONT bandwidth allocation method in the disclosure is not limited to that mentioned above, and may be other T-CONT bandwidth allocation methods. In a word, any T-CONT bandwidth allocation methods which can satisfy the condition that the total bandwidth is B=L×n−R bytes can avoid the case that the length of the remaining data is smaller than a fixed size when the ONU performs FEC encoding and they should all belong to the protection scope of the disclosure.

Accordingly, in a GPON system, when an ONU performs FEC encoding, since the encoding range starts from a BIP domain of an upstream burst slot as show in FIG. 3 and ends at a domain of the last group of payloads, and the block length of FEC-encoded data is a fixed size, the contents protected by the FEC before the payload part in an upstream burst slot transmitted by the ONU is BIP, an ONU ID and an indication domain, the total length H of their contents is 3 bytes, and the byte length T of the contents protected by FEC after the payload part in an upstream burst slot transmitted by the ONU is 0, then R=H+T=3+0=3. Therefore, as long as the total bandwidth B of the T-CONTs allocated by the OLT for the ONU satisfies: B=L×n−3 bytes (n is an integer, and n≥1), the case that the length of the remaining data is smaller than a fixed size can be avoided when the ONU performs FEC encoding.

Step 402: the ONU encapsulates upstream data according to the size of the T-CONT total bandwidth allocated by the OLT and transmits it to the OLT.

The above method for upstream bandwidth allocation in a PON is further described in details below in combination with the embodiments.

In a GPON system of an embodiment of the disclosure, FEC encoding is performed on upstream data of an ONU. Block-based encoding is applied, in which a data block with a length of 232 bytes is taken to perform the FEC encoding, and 16-byte redundancy bytes are obtained through calculation. The 16-byte redundancy bytes are placed at the end of 232-byte data information. The 232-byte data information and the 16-byte redundancy bytes constitute a 248-byte code word (the FEC algorithm is only an example of the disclosure and the disclosure may also use other FEC algorithms).

The total length B of payloads which can be transmitted by consecutive T-CONTs allocated by the OLT for the ONU is: B=232×n−R bytes, where n is an integer and n≥1, R is the byte length of the contents, protected by FEC, except the payloads, in an upstream burst slot transmitted by the ONU, and R=H+T; where H is the byte length of the contents protected by FEC before the payload in the upstream burst slot transmitted by the ONU, T is the byte length of the contents protected by FEC after the payload in the upstream burst slot transmitted by the ONU, moreover, in an existing GPON system, H=3, T=0, e.g. the OLT allocates consecutive upstream transmission bandwidths for three T-CONTs of the ONU through three Allocation Structures in a BWmap domain of a downlink frame. The length of a payload transmitted in a T-CONT of the ONU corresponding to the first Allocation Structure is 461 (i.e. 461=232×2−3) bytes; the length of a payload transmitted in a T-CONT of the ONU corresponding to the second Allocation Structure is 2320 (i.e. 2320=232×10) bytes; and the length of a payload transmitted in a T-CONT of the ONU corresponding to the third Allocation Structure is 4176 (i.e. 4176=232×18−0) bytes. The total bandwidth B allocated by the OLT to the ONU can transmit a 6957-byte payload (i.e. B=232×30−3).

After receiving the Allocation Structures transmitted by the OLT, the ONU prepare to transmit data according to the size of the upstream bandwidth of each T-CONT. If there is no sufficient data which needs to be transmitted in a certain T-CONT, the ONU transmits an idle frame. After the ONU encapsulates data in all parts of the transmitted upstream burst slot, an FEC encoder of the ONU performs FEC encoding on the data in each part. The FEC encoding range starts from a BIP domain of the upstream burst slot and ends at a domain of the last group of payloads. Since former 229-byte data in the first T-CONT undergoes FEC encoding together with 3-byte data of BIP, an ONU ID and an indication domain, the upstream bandwidths of the second and third T-CONTs can be used for transmitting payloads of an integral multiple of 232 bytes. Therefore, the sum of the data of the BIP, the ONU ID and the indication domain, the data in the first T-CONT, the data in the second T-CONT and the data in the third T-CONT is an integral multiple of 232 bytes. In other words, the FEC encoder does not need to add a "0" byte in front of the remaining data to complete the FEC encoding.

In the embodiment above, the bandwidth of the first T-CONT can be used for transmitting a payload of L×m−H bytes (m is an integer, m≥1, H=3, and H is the byte length of the contents protected by FEC in front of the payload in an upstream burst slot transmitted for the ONU). The bandwidths of the second and third T-CONTs can be used for transmitting a payload of L×k bytes (k is an integer and k≥1). It should be noted that, the bandwidths of the three T-CONTs each may not need to satisfy the rule above, as long as the total bandwidth B of the three T-CONTs satisfies B=L×n−R bytes, where L is the length of data contained in a code word when the ONU uses FEC encoding, n is an integer and n≥1.

In addition, according to the above method for upstream bandwidth allocation in a PON, the disclosure further provides a system for upstream bandwidth allocation in a PON, which is composed of an OLT and an ONU. The OLT is configured to allocate an upstream bandwidth for the ONU through a US BWmap domain, wherein the total length B of payloads transmitted by consecutive T-CONTs allocated for the ONU is: the product of a positive integer n and a byte length L of data contained in a code word when the ONU uses FEC encoding, minus a byte length R of the contents, protected by FEC, except the payloads, in an upstream burst slot transmitted by the ONU, i.e. B=L×n−R bytes. The ONU is configured to encapsulate upstream data according to the size of a T-CONT total bandwidth allocated by the OLT and transmit it to the OLT.

Preferably, the length of a payload transmitted by the first T-CONT allocated by the OLT for the ONU is L×m−H bytes, the length of a payload transmitted by the last T-CONT allocated by the OLT for the ONU is L×m−T bytes, and the length of a payload which is transmitted neither by the first T-CONT nor by the last T-CONT allocated by the OLT for the ONU is L×p bytes; wherein L represents a code word length when the ONU uses FEC encoding; m, k and p are positive integers while m, k, p<n; H is the byte length of the contents protected by FEC before the payload part in one upstream burst slot transmitted by the ONU, and T is the byte length of the contents protected by FEC after the payload part in one upstream burst slot transmitted by the ONU.

To sum up, the ONU performs FEC encoding on taken-out data blocks with a fixed size, wherein the quantity of the data blocks is an integral number, thus avoiding adding an additional "0" byte in front of the remaining data. No matter applied to a GPON system or a PON system of the next generation, the method of the disclosure can reduce the complexity of processing FEC-encoded data by an ONU and an OLT, and improve the encoding efficiency of the ONU and the decoding efficiency of the OLT.

The above are only preferred embodiments of the disclosure and should not be used to limit the scope of protection of the disclosure.

The invention claimed is:

1. A method for upstream bandwidth allocation in a Passive Optical Network (PON), comprising:

allocating, by an Optical Line Terminal (OLT), an upstream bandwidth for an Optical Network Unit (ONU) through an Upstream Bandwidth Map (US BWmap) domain in terms of a total length B of payloads transmitted by consecutive Transmission Containers (T-CONTs) allocated for the ONU, wherein B is the product of a positive integer n and a byte length L of data contained in one code word when the ONU uses Forward Error Correction (FEC) encoding, minus a byte length R of contents protected by FEC, except the payloads, in an upstream burst slot transmitted by the ONU, i.e. B=L×n−R bytes, wherein the product of n and L is a byte length of contents protected by FEC in an upstream burst slot transmitted by the ONU; and encapsulating, by the ONU, upstream data according to the upstream bandwidth allocated by the OLT, and transmitting the upstream data by the ONU to the OLT.

2. The method for upstream bandwidth allocation in a PON according to claim 1, wherein the method further comprises:

a length of a payload transmitted by a first T-CONT allocated by the OLT for the ONU is L×m−H bytes, where H is a byte length of contents protected by FEC before the payload in the upstream burst slot transmitted by the ONU;

a length of a payload transmitted by a last T-CONT allocated for the ONU is L×k−T bytes, where T is a byte length of contents protected by FEC after the payload in the upstream burst slot transmitted by the ONU; and a length of a payload which is transmitted neither by the first T-CONT nor by the last T-CONT allocated for the ONU is L×p bytes, where L represents a byte length of data contained in one code word when the ONU uses FEC encoding, m and k are positive integers while m, k, p<n, and H+T=R.

3. The method for upstream bandwidth allocation in a PON according to claim 1, further comprising: when the ONU encapsulates the upstream data according to the size of the T-CONT total bandwidth allocated by the OLT, transmitting an idle frame when there is no sufficient data which needs to be transmitted in a certain T-CONT.

4. A system for upstream bandwidth allocation in a Passive Optical Network (PON), comprising an Optical Line Terminal (OLT) and an Optical Network Unit (ONU), wherein the OLT is configured to allocate an upstream bandwidth for the ONU through an Upstream Bandwidth Map (US BWmap) domain in terms of a total length B of payloads transmitted by consecutive Transmission Containers (T-CONTs) allocated for the ONU, wherein B is the product of a positive integer n and a byte length L of data contained in one code word when the ONU uses Forward Error Correction (FEC) encoding, minus a byte length R of contents protected by FEC, except the payloads, in an upstream burst slot transmitted by the ONU, i.e. B=L×n−R bytes, wherein the product of n and L is a byte length of contents protected by FEC in an upstream burst slot transmitted by the ONU; and the ONU is configured to encapsulate upstream data according to the upstream bandwidth allocated by the OLT, and transmitting the upstream data by the ONU to the OLT.

5. The system for upstream bandwidth allocation in a PON according to claim 4, wherein the OLT is further configured to: a length of a payload transmitted by a first T-CONT allocated for the ONU is L×m−H bytes, where H is a byte length of contents protected by FEC before the payload in the upstream burst slot transmitted by the ONU;

a length of a payload transmitted by a last T-CONT allocated for the ONU is L×k−T bytes, where T is a byte length of contents protected by FEC after the payload in the upstream burst slot transmitted by the ONU; and a length of a payload transmitted by a T-CONT allocated for the ONU, which is neither the first T-CONT nor the last T-CONT, is L×p bytes, where L represents a byte length of data contained in one code word when the ONU uses FEC encoding, m and k are positive integers while m, k, p<n, and H+T=R.

6. The system for upstream bandwidth allocation in a PON according to claim 4, wherein the ONU is further configured to, when the ONU encapsulates the upstream data according to the size of the T-CONT total bandwidth allocated by the OLT, transmit an idle frame when there is no sufficient data which needs to be transmitted in a certain T-CONT.

7. The method for upstream bandwidth allocation in a PON according to claim 2, further comprising: when the ONU encapsulates the upstream data according to the size of the T-CONT total bandwidth allocated by the OLT, transmitting an idle frame when there is no sufficient data which needs to be transmitted in a certain T-CONT.

8. The system for upstream bandwidth allocation in a PON according to claim 5, wherein the ONU is further configured to, when the ONU encapsulates the upstream data according to the size of the T-CONT total bandwidth allocated by the OLT, transmit an idle frame when there is no sufficient data which needs to be transmitted in a certain T-CONT.

* * * * *